United States Patent
Akiba

(10) Patent No.: US 8,303,069 B2
(45) Date of Patent: Nov. 6, 2012

(54) IMAGE PROCESSING APPARATUS AND IMAGE PROCESSING METHOD

(75) Inventor: Hiromitsu Akiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 12/846,176

(22) Filed: Jul. 29, 2010

(65) Prior Publication Data

US 2011/0037801 A1 Feb. 17, 2011

(30) Foreign Application Priority Data

Aug. 13, 2009 (JP) ................................. 2009-187833

(51) Int. Cl.
- B41J 29/38 (2006.01)
- B41J 2/21 (2006.01)
- G06K 15/00 (2006.01)

(52) U.S. Cl. ................ 347/14; 347/15; 347/43; 358/2.1

(58) Field of Classification Search .............. 347/14–15, 347/43; 358/2.1

See application file for complete search history.

(56) References Cited

U.S. PATENT DOCUMENTS

| 7,145,693 | B2 | 12/2006 | Kagawa | |
|---|---|---|---|---|
| 2005/0264850 | A1* | 12/2005 | Kim et al. | 358/2.1 |
| 2007/0126792 | A1* | 6/2007 | Couwenhoven et al. | 347/43 |

FOREIGN PATENT DOCUMENTS

JP 3762267 4/2006

* cited by examiner

*Primary Examiner* — Jason Uhlenhake

(74) *Attorney, Agent, or Firm* — Fitzpatrick, Cella, Harper & Scinto

(57) ABSTRACT

A determination is made, throughout one page, of whether a unit region is to be printed chromatically or achromatically, or nothing is to be printed; a determination is made of whether or not, in the one page, there is at least one unit region determined to be printed achromatically between two unit regions where nothing is to be printed; when it is determined that there is at least one such unit region, a determination is further made of whether or not there is at least one unit region determined to be printed chromatically between the two unit regions where nothing is to be printed; when it is determined that there is at least one such unit region, the determination results of the unit region determined to be printed achromatically are changed to chromatic printing; and printing is performed according to the changed results.

11 Claims, 7 Drawing Sheets

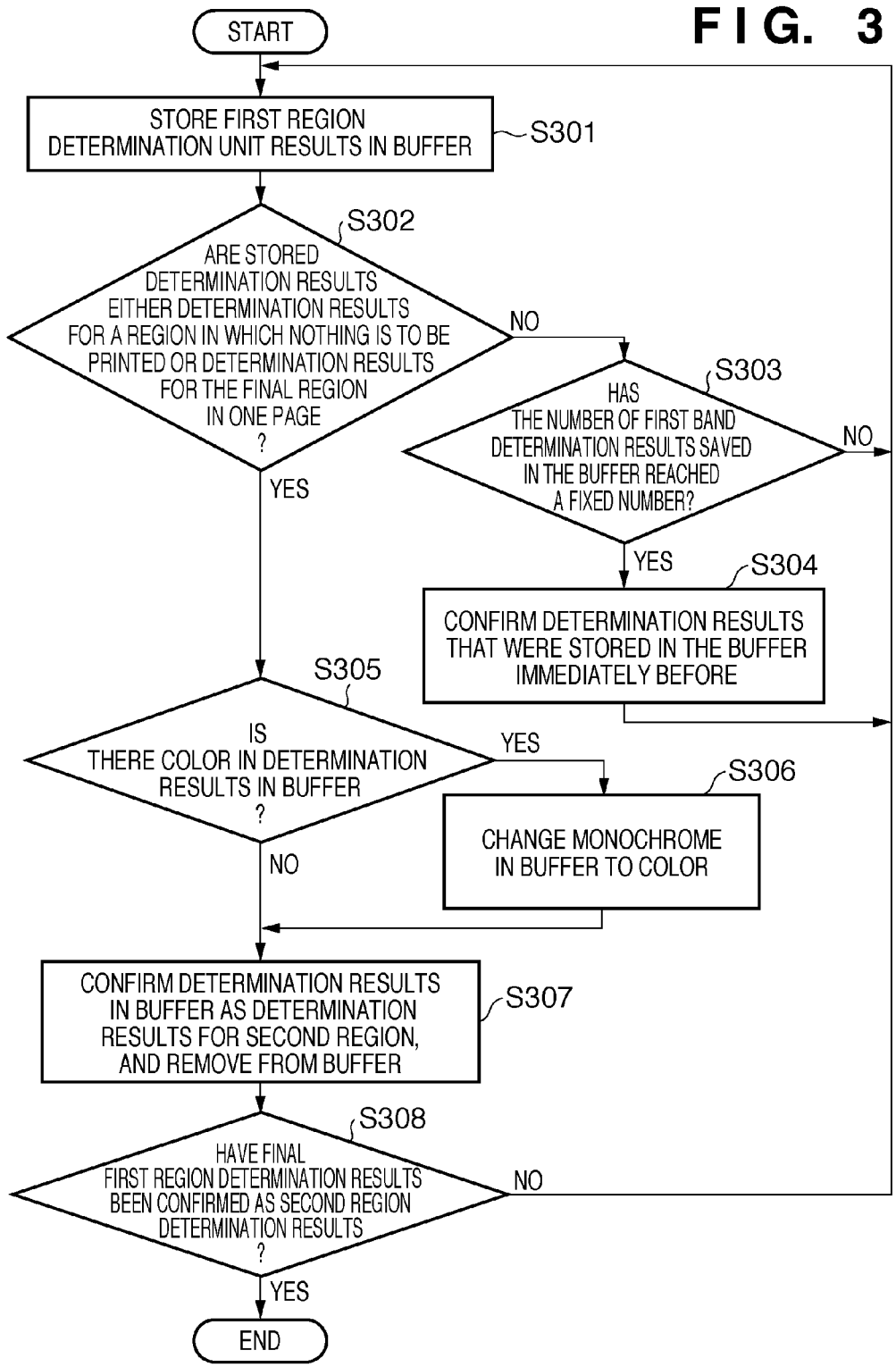

IMAGE PROCESSING APPARATUS AND IMAGE PROCESSING METHOD

BACKGROUND OF THE INVENTION

1. Field of the Invention

The present invention relates to an image processing apparatus and method for performing color determination processing.

2. Description of the Related Art

In a conventional image processing apparatus, various techniques are used in order to improve printing speed. For example, technology is known whereby in an image processing apparatus employing an inkjet method in a printing unit, the printing speed of monochrome images is improved by increasing the range that can be printed at once by adopting a greater length for a row of nozzles used for black (Bk) printing than for other rows of nozzles used for color printing.

Also, technology is known whereby using this elongated row of nozzles for Bk printing, printing speed is also improved for text or the like that is unintentionally processed as a color image due to a color shift when reading a color copy (Japanese Patent No. 3762267). According to this technology, image data is divided into unit regions having a predetermined number of lines, features of those unit regions are determined, and the row of nozzles used is switched for each unit region. For a color region that includes a color image, both rows of nozzles for color printing and a longer row of nozzles for Bk printing are used, and for a monochrome region that includes a monochrome image but not a color image, only the longer row of nozzles for Bk printing is used. Thus, high speed printing can be executed.

However, with a conventional technique of printing acceleration employing region determination, the region determination is only performed at pixels constituting a unit region, so there is the problem that for an object spanning a plurality of unit regions, determination results are switched in the midst of the object. For example, with image data as shown in FIG. 5A (where B indicates a black object, and C indicates a color object), according to the conventional technique, as shown in FIG. 5B, the region determination results may sometimes be switched in the midst of objects B4 and B5. In such a case, there are the problems that for a black object, there occurs both a portion in which monochrome is determined and so printing is performed with only Bk ink, and also a portion in which printing is performed with both Bk ink and CL ink, and above and below a border, coloration differs due to different ink being used (a region of color ink and Bk ink versus a region of only Bk ink), and the perception of granularity differs due to a difference in the size of nozzles used.

If the row of nozzles used is switched on a per-object basis, a border does not occur, but in this case it is necessary to determine whether or not an object continues in the vertical direction and/or in the horizontal direction. Therefore, it is necessary to determine attributes in narrowly divided regions, and as a result there is the problem that the processing load increases.

SUMMARY OF THE INVENTION

An aspect of the present invention is to eliminate the above-mentioned problems with the conventional technology.

The present invention provides an image processing apparatus and an image processing method for outputting high-quality images by suppressing differences in coloration or perception of granularity.

The present invention in its first aspect provides an image processing method for, in order to print to a printing region on a printing medium by scanning a first row of nozzles for ejecting chromatic ink and a second row of nozzles for ejecting achromatic ink in a scanning direction, processing data corresponding to an image to be printed to the printing area, the method comprising: a determination step of determining, based on data corresponding to the printing region, for each unit region obtained by dividing the printing region in a direction intersecting the scanning direction, whether the unit region is a first region where printing is to be performed using at least chromatic ink, a second region where printing is to be performed using only achromatic ink, or a third region where printing is not to be performed using chromatic ink or achromatic ink; and a changing step of, when there exists both a unit region that has been determined to be the first region and a unit region that has been determined to be the second region between unit regions that have been determined to be the third region, changing the determination results of the unit region that has been determined to be the second region to the first region.

The present invention in its second aspect provides an image processing apparatus that, in order to print to a printing region on a printing medium by scanning a first row of nozzles for ejecting chromatic ink and a second row of nozzles for ejecting achromatic ink in a scanning direction, processes data corresponding to an image to be printed to the printing area, the apparatus comprising: a determination unit configured to determine, based on data corresponding to the printing region, for each unit region obtained by dividing the printing region in a direction intersecting the scanning direction, whether the unit region is a first region where printing is to be performed using at least chromatic ink, a second region where printing is to be performed using only achromatic ink, or a third region where printing is not to be performed using chromatic ink or achromatic ink; and a changing unit configured to, when there exists both a unit region that has been determined to be the first region and a unit region that has been determined to be the second region between unit regions that have been determined to be the third region, change the determination results of the unit region that has been determined to be the second region to the first region.

According to the present invention, it is possible to output high-quality images by suppressing differences in coloration or perception of granularity.

Further features of the present invention will become apparent from the following description of exemplary embodiments with reference to the attached drawings.

BRIEF DESCRIPTION OF THE DRAWINGS

FIG. 3 is a flowchart that shows a procedure of processing of a second region determination that adapts first region determination results to uniform determination results.

DESCRIPTION OF THE EMBODIMENTS

First Embodiment

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference symbols are assigned to the same constituent elements, and a repeated description of such constituent elements is omitted.

Figure 6:
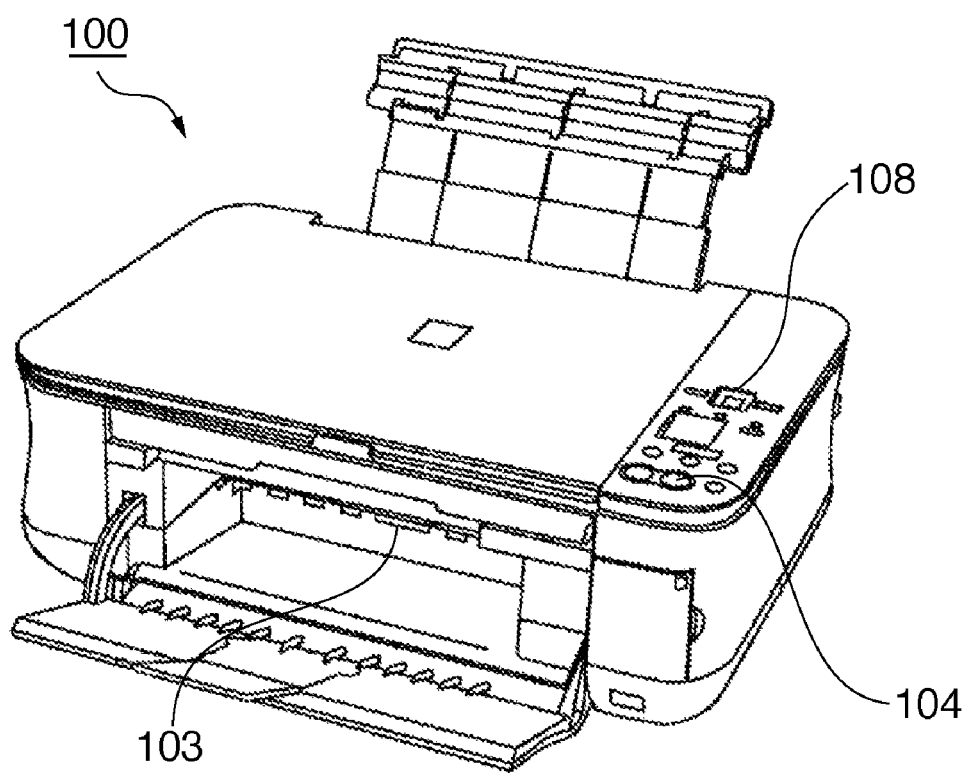
FIG. 6 is an exterior view of the image processing apparatus in the present embodiment.

FIG. 6 shows a perspective view of a multifunction printer apparatus (referred to below as an image processing apparatus 100) serving as a representative embodiment of the present invention. As shown in FIG. 6, the image processing apparatus 100 includes a reading unit 101, a print unit (printing unit) 103, an operation unit 104, and a display unit 108.

Figure 7A:
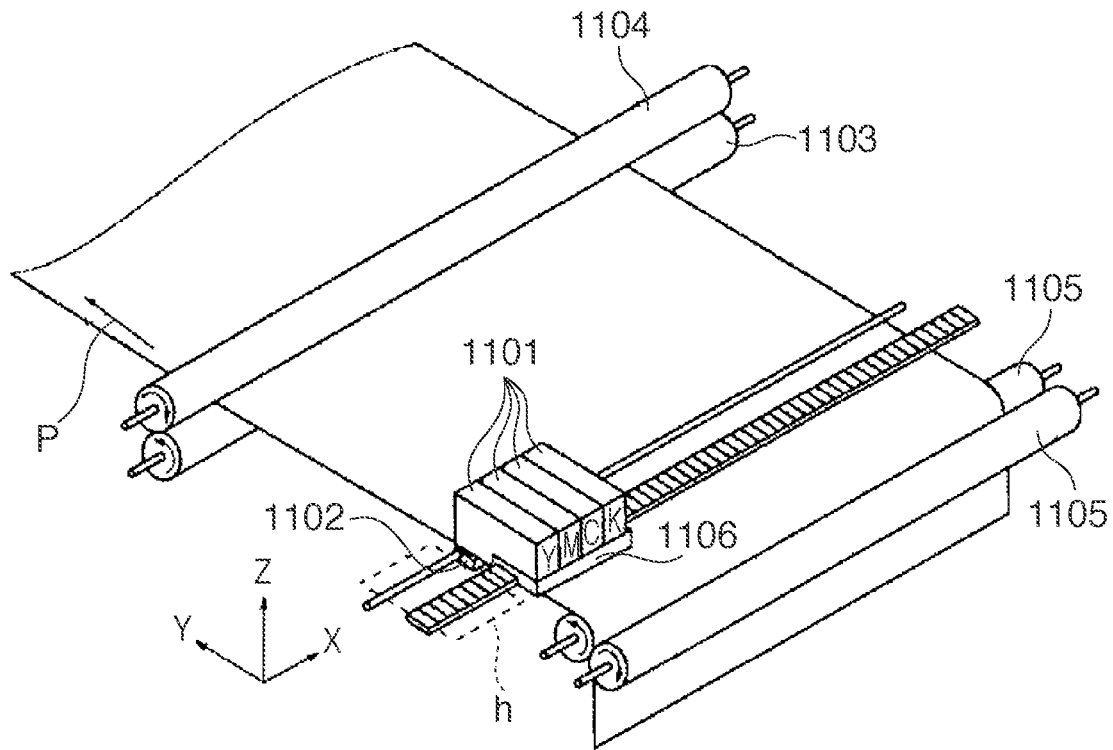
FIGS. 7A and 7B illustrate the configuration of a print unit in the present embodiment.
Figure 7B:
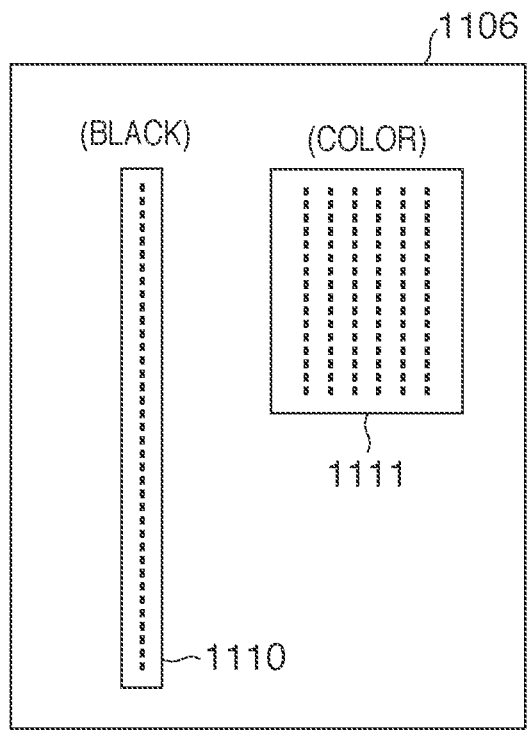

FIG. 7A shows the configuration of the print unit 103. In FIG. 7A, reference numeral 1101 denotes inkjet cartridges. These are configured from ink tanks respectively containing black ink, which is achromatic ink, and cyan, magenta, and yellow inks, which are chromatic inks, and a printing head 1102 provided with nozzle rows corresponding to the respective inks. FIG. 7B shows a face (ejection face) where the nozzle rows of the printing head 1102 have been formed, and here, a black nozzle row (Bk) 1110 for black printing is longer than other nozzle rows, that is, color nozzle rows (CL) 1111 for color printing. By scanning a cartridge on which this sort of printing head 1102 is mounted, printing to a printing medium is performed, and in particular, printing is performed at high speed using the elongated black nozzle row for regions in which only black ink is to be printed.

Returning to FIG. 7A, reference numeral 1103 denotes a paper feed roller, which rotates together with an auxiliary roller 1104 in the directions indicated by the arrows in FIG. 7A while holding a printing medium P sandwiched therebetween, and thus transports the printing medium P as necessary in direction y (the sub-scanning direction, transport direction, and paper feed direction). Reference numeral 1105 denotes a pair of supply rollers, which supply the printing medium. The pair of rollers 1105, like the rollers 1103 and 1104, rotate while holding the printing medium P sandwiched therebetween, but by setting a smaller rotational velocity for the pair of rollers 1105 than for the paper feed roller 1103, it is possible to cause tension to act on the printing medium. Reference numeral 1106 denotes a carriage that supports the four ink jet cartridges 1101, and allows scanning of these cartridges along with printing. The carriage 1106 waits at a home position h indicated by broken lines in FIG. 7A when not printing, or when a recovery process or the like of the printing head 1102 is performed.

Figure 1:
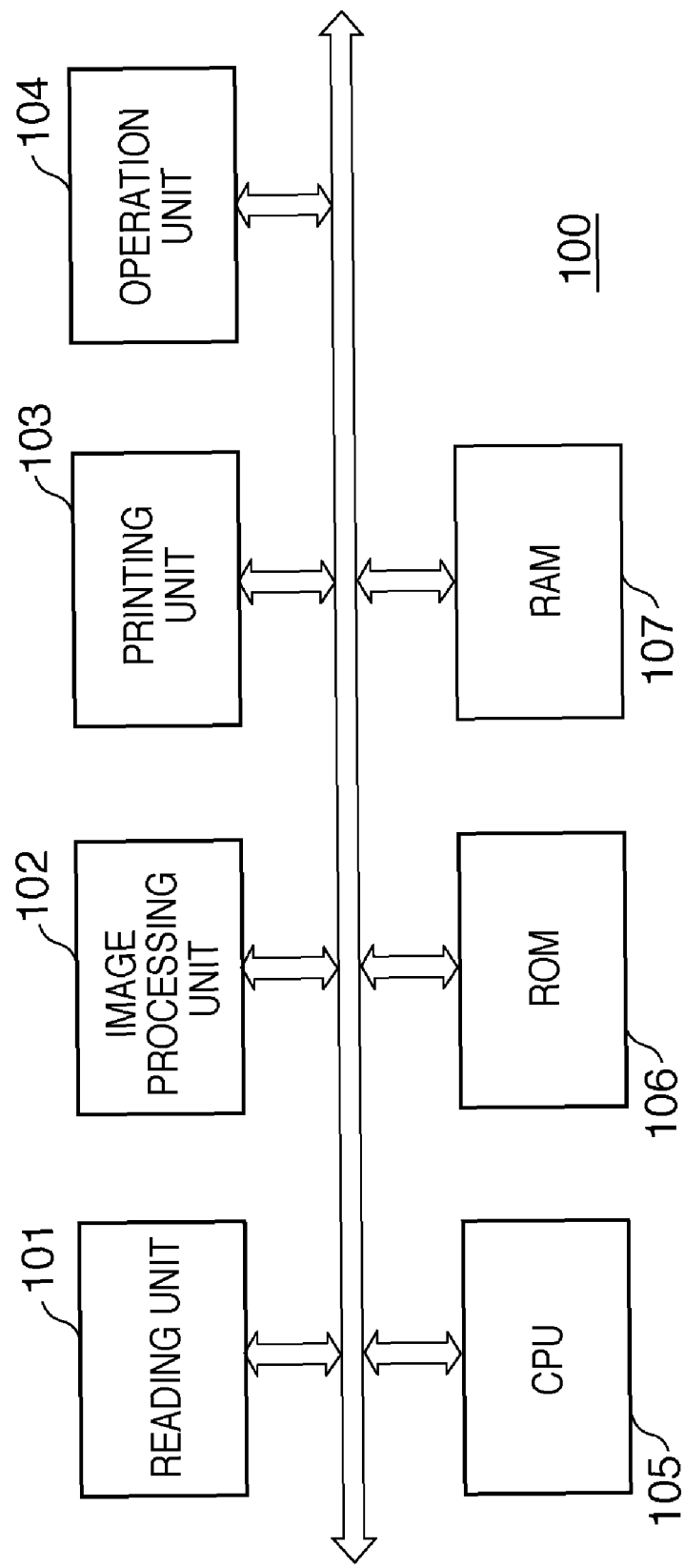
FIG. 1 is a block diagram that shows a configuration of an image processing apparatus.

FIG. 1 is a block diagram that shows the configuration of the image processing apparatus 100 of the present embodiment. A CPU 105 is a control unit that controls the whole of the image processing apparatus via a system bus. A ROM 106 is a ROM where program code for operation of the CPU 105, default data, table data used by an image processing unit 102, and so forth are stored. The reading unit 101 converts an image that has been optically read at a predetermined resolution to an electrical analog signal, and converts that analog signal to a digital signal by performing AD conversion. The image processing unit 102 is an image processing unit that performs image processing such as filter processing on the digital signal read by the reading unit 101. A RAM 107 is a RAM used for an image buffer and an image memory. The RAM 107 temporarily stores digital data read by the reading unit 101, and is used as a work memory when performing image processing in the image processing unit 102.

The operation unit 104 includes a display unit that displays various messages such as for set-up, registration, confirmation, and error notification. The operation unit 104 also includes keys such as a mode key used to select operation modes such as scan and copy, a setup key used to select quality and density during copying, a color start key that works in color mode according to the selected mode, and a monochrome key that works in monochrome mode according to the selected mode.

The image processing apparatus has a print function, a scan function, and a copy function. The print function is a function of causing the print unit 103 to perform printing based on image data received from a connected host (not shown). The scan function is a function of converting an original image read by the reading unit 101 into digital data and transmitting the digital data to a host. The copy function is a function of causing the image processing unit 102 to perform image processing on an image read by the reading unit 101 and causing the print unit 103 to perform printing.

Following is a description of copy operation. A user makes various settings for copying based on information displayed on the display unit of the operation unit 104. The user selects a copy mode by pressing the mode key, sets copy quality and printing density by pressing the setting key, and then starts color copy operation by pressing the color start key. When the color copy operation is started, the reading unit 101, which includes a contact image sensor (CIS) unit, reads an original image and outputs analog luminance signals of red (R), green (G), and blue (B). The analog luminance signals are converted into digital signals by an AD conversion unit and transmitted to the image processing unit 102 via the bus.

The image processing unit 102 performs image processing such as shading compensation for correcting light source unevenness and sensor sensitivity variations, image region separation processing for separating character portions from image portions, filtering processing for adopting an edge-enhancing filter according to results of the image region separation processing, and color conversion processing for performing color conversion. Image data that has undergone image processing is transmitted to the print unit 103. The print unit 103 performs color separation processing in which RGB data is converted into CMYK, i.e., ink colors for printing. The color-separated CMYK data is converted through error diffusion processing into binary data indicating whether or not an ink droplet is applied. Based on the binary data obtained by the conversion, ink droplets are ejected onto a paper face to form an image, thus forming a copy image.

Figure 2:
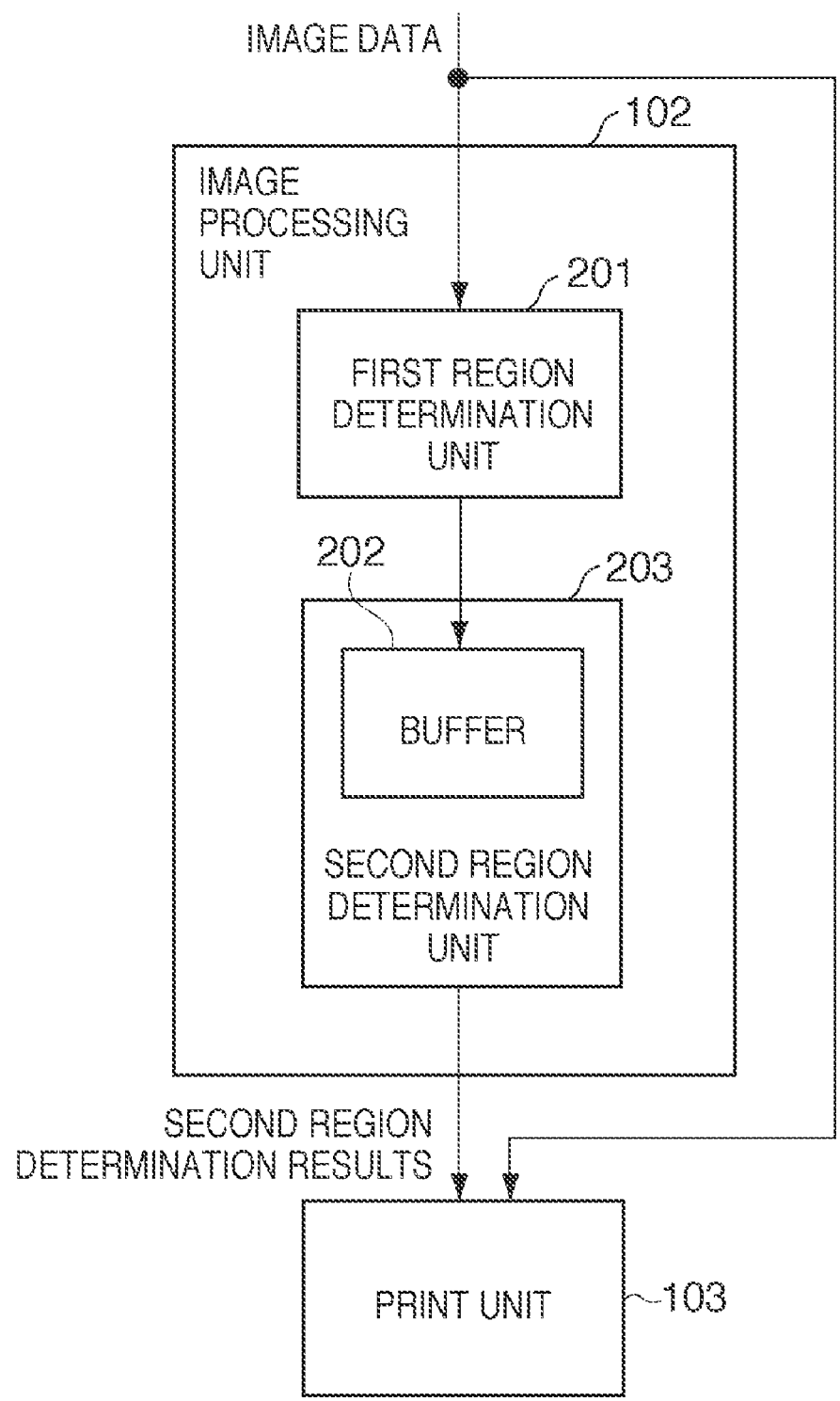
FIG. 2 shows a configuration of an image processing unit.

FIG. 2 shows the configuration of the image processing unit 102 of the present invention. A first region determination unit 201 performs color determination of whether a unit region is a color region (a region in which at least color ink is to be printed), a monochrome region (a region in which only black ink is to be printed), or a region in which nothing is to be printed, for each unit region, based on data that has been converted to a digital signal (RGB signal) in the reading unit 101, and outputs the results of the determination as first region determination results. In the present example, each unit region is a region obtained by dividing a printing region on the printing medium where an image is to be printed by a predetermined number of lines (such as 32 lines) in the sub-scanning direction. The first region determination results are saved in a buffer 202, up to a fixed number of regions. A second region determination unit 203 unifies the first region determination results that have been saved in the buffer 202 in a plurality of unit regions sandwiched by regions in which nothing is to be printed, and outputs the unified results as the second region determination results. In the image processing unit 102, based on the second region determination results, the above data processing is performed to generate binary data corresponding to ink colors. Therefore, even if a unit region is a monochrome region (a region in which only black ink is to be printed) according to the RGB signal read by the reading unit 101, depending on the second region determination results, data may be generated as though this unit region is a color region (a region in which at least color ink is to be printed). The print unit 103 performs print processing in which different nozzle rows are used depending on the ink data that has been generated using the second region determination results, for example.

The procedure of processing of the second region determination that unifies the first region determination results to uniform determination results will be described with reference to the flowchart in FIG. 3. The processing of the flowchart shown in FIG. 3 is executed by the CPU 105, for example. In Step S301, the first region determination results are stored in the buffer. In Step S302, a determination is made of whether the stored determination results are for a region in which nothing is to be printed, or alternatively, are the final first region determination results for one page (an example of a first determination process). When neither is the case, the procedure advances to Step S303, where a determination is made of whether the number of first region determination results saved in the buffer has reached a fixed number. When determined that the fixed number has not been reached, the procedure returns to Step S301. On the other hand, when determined that the fixed number has been reached, the procedure advances to Step S304, where the first region determination results that are oldest among those stored in the buffer are confirmed as-is as the second region determination results, then removed from the buffer, and then the procedure returns to Step S301. By the processing in Steps S301 to S303, it is possible to detect a plurality of unit regions sandwiched by regions in which nothing is to be printed.

In Step S302, when the stored determination results are for a region in which nothing is to be printed, or alternatively, are final determination results, the procedure advances to Step S305, where a determination is made of whether or not there is color in the first region determination results stored in the buffer (an example of a second determination process). When there is color, the procedure advances to Step S306, where the monochrome determination results stored in the buffer are changed to color determination results, and then the procedure advances to Step S307. On the other hand, when there is not color, the procedure advances directly to Step S307 (an example of a third determination process). In Step S307, all of the first region determination results stored in the buffer are confirmed as the second region determination results, and removed from the buffer. In Step S308, a determination is made of whether or not the final first region determination results have been confirmed as the second region determination results. Here, when the final first region determination results have not been confirmed, the procedure returns to Step S301. On the other hand, when the final first region determination results have been confirmed, this processing is ended.

In the present embodiment, color and monochrome may be substituted for each other. That is, in Step S305, a determination may be made of whether or not there is monochrome in the first region determination results stored in the buffer. Here, when there is monochrome, the procedure advances to Step S306, where the color determination results stored in the buffer are changed to monochrome determination results, and then the procedure advances to Step S307. On the other hand, when there is not monochrome, the procedure may advance directly to Step S307.

After the processing in the flowchart shown in FIG. 3 ends, printing is performed according to the determination results of each unit region. At this time, when a monochrome determination has been made for a unit region sandwiched by regions where nothing is to be printed, it is possible to realize high-speed print processing by using a long row of nozzles for Bk printing as shown in FIG. 7B.

Figure 4A:
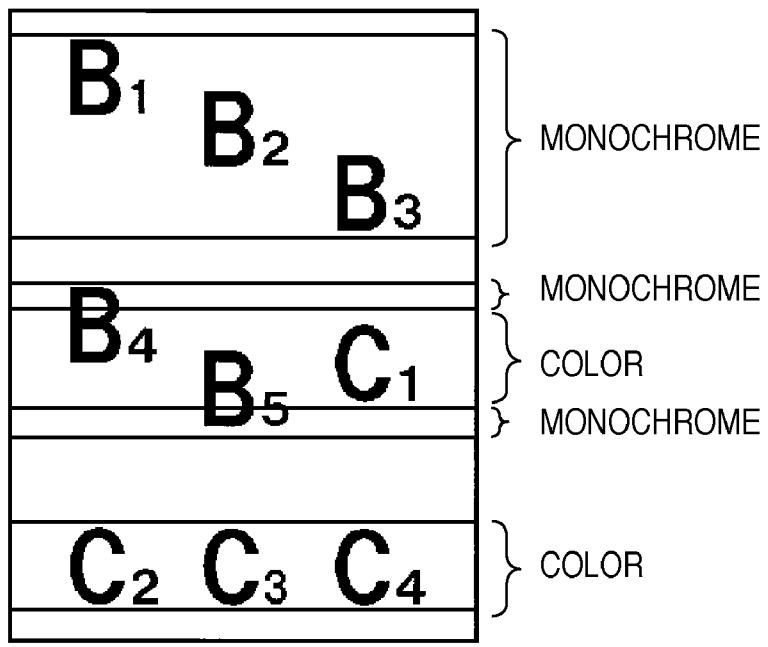
FIGS. 4A and 4B show region determination results in the present embodiment.
Figure 4B:
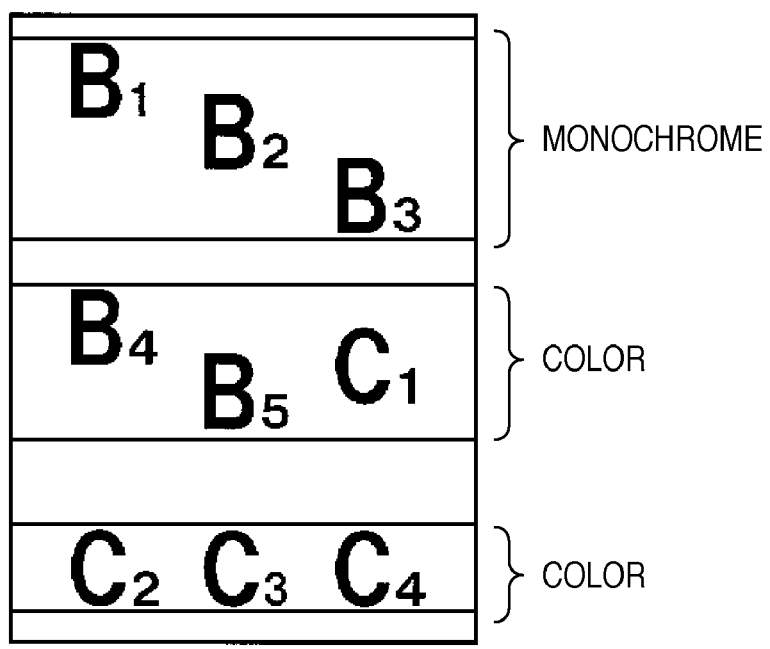
Figure 5A:
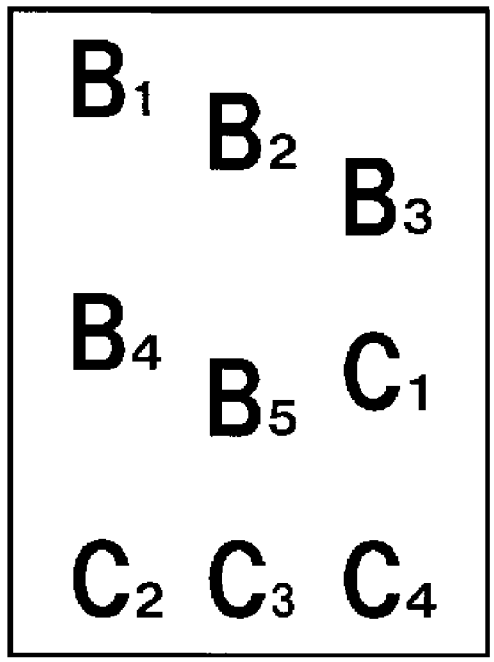
FIGS. 5A and 5B show region determination results in the conventional technology.
Figure 5B:
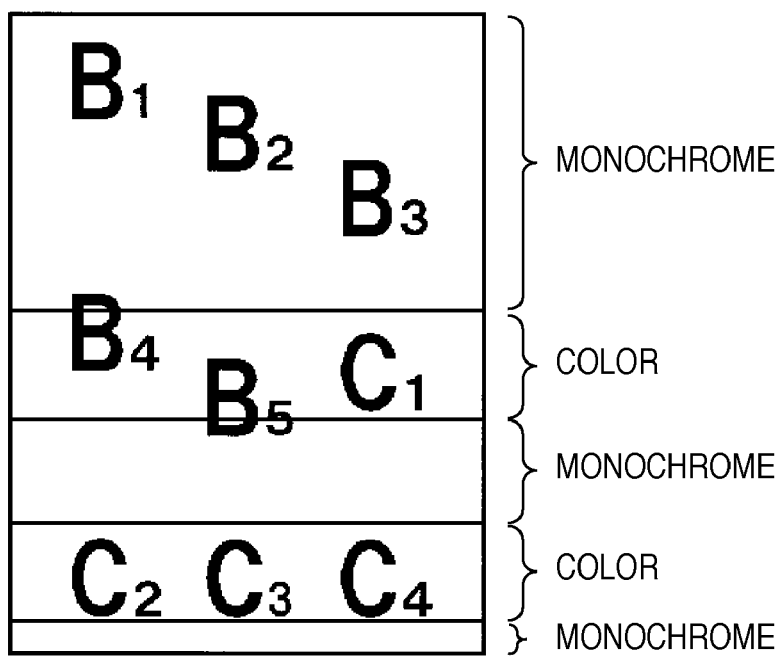

As described above, in the present embodiment, it is possible to suppress a phenomenon in which region determination results are switched in the midst of an object in image data. Therefore, it is possible to output high-quality images by preventing differences in coloration or perception of granularity. With image data as shown in FIG. 5A, when a region in which ink will not be printed because the region does not include an object is determined to be a region in which nothing is to be printed, the region determination results are as shown in FIG. 4A. In the present embodiment, unit regions to be sandwiched by regions where nothing is to be printed are adapted to have uniform determination results, so the region determination results are as shown in FIG. 4B. As a result, switching that occurred in the midst of B4 and B5 is suppressed. Also, with the configuration in this example, it is not necessary to determine attributes in narrowly divided regions, so the processing load can be reduced.

An important aspect of the present embodiment is that by unifying region determination results (monochrome/color) of a plurality of unit regions to be sandwiched between regions where nothing is to be printed, a phenomenon is suppressed in which region determination results switch in the midst of an object in the image data. According to this configuration, the combination of inks used will not be changed, so it is possible to eliminate the problem of a worsening of perceived granularity. Therefore, the length of the rows of nozzles for color printing and the length of the row of nozzles for black printing may be the same, or the length of the rows of nozzles for color printing may be longer. In this case, it is possible to realize high speed printing by using the longer row of nozzles more frequently.

Also, the monochrome region and color region are not limited to the above example; for example, the monochrome region may also be a region of only black, and the color region may be a region including only cyan, magenta, or yellow. In this case, with the conventional method, a black object in a black region will be printed with black ink, but a black object in a color region will be printed using a composite black including cyan, magenta, and yellow. Therefore, when a black region and a color region are intermingled within a single object, there is a risk that the coloration of black will unintentionally change, but according to the present embodiment, the above problem also can be eliminated because switching of region determination results in the midst of an object can be suppressed.

Also, rather than classifying regions using classifications color and monochrome as in the present embodiment, a configuration may be adopted in which, for example, regions are classified using classifications such as cyan, magenta, and yellow, and determination results are adapted to uniform determination results for each unit region sandwiched by regions in which nothing is to be printed in the image data.

Also, in the present embodiment, an example was described in which region determination is performed based on image data that has been read by the reading unit, but the region determination in the present embodiment can likewise be performed with respect to image data that has been input from an external apparatus (host). Also, in the present embodiment there may be no upper limit (fixed number) to the number of first region determination results that can be saved in the buffer. For example, detection results for one page may be saved. Also, the second region determination results may also be used other than when printing, such as when transmitting data or when printing data to a medium other than paper (such as an HDD), or when performing data compression or the like. Note that in the present embodiment, a multifunction printer apparatus (printing apparatus) provided with the image processing unit 102 having an image processing function was described as an example of an image processing apparatus for executing image processing that is a feature of the present invention, but the present invention is not limited to such a configuration. A configuration may also be adopted in which image processing that is a feature of the present invention is executed by a host apparatus where a printer driver has been installed. In such a case, a host apparatus (external device) capable of connection to the printing apparatus corresponds to the image processing apparatus of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-187833, filed Aug. 13, 2009, which is hereby incorporated by reference herein in its entirety.

What is claimed is:

1. An image processing method for, in order to print to a printing region on a printing medium by scanning a first row of nozzles for ejecting chromatic ink and a second row of nozzles for ejecting achromatic ink in a scanning direction, processing data corresponding to an image to be printed to the printing area, the method comprising:
   a determination step of determining, based on data corresponding to the printing region, for each unit region obtained by dividing the printing region in a direction intersecting the scanning direction, whether the unit region is a first region where printing is to be performed using at least chromatic ink, a second region where printing is to be performed using only achromatic ink, or a third region where printing is not to be performed using chromatic ink or achromatic ink; and
   a changing step of, when there exists both a unit region that has been determined to be the first region and a unit region that has been determined to be the second region between unit regions that have been determined to be the third region, changing the determination results of the unit region that has been determined to be the second region to the first region.

2. The image processing method according to claim 1, further comprising:
   a second determination step of determining whether a unit region that has been determined to be the second region exists between unit regions that have been determined to be the third region; and
   a third determination step of determining, when a determination has been made that a unit region that has been determined to be the second region exists between unit regions that have been determined to be the third region, determining whether a unit region that has been determined to be the first region exists between unit regions that have been determined to be the third region.

3. The image processing method according to claim 1, wherein the first region is a region where printing is to be performed using both chromatic ink and achromatic ink.

4. The image processing method according to claim 1, wherein the first region is a region where printing is to be performed using only chromatic ink.

5. The image processing method according to claim 1, wherein the data corresponding to the printing region is RGB data.

6. The image processing method according to claim 5, further comprising:
   a generating step of generating, for a unit region whose determination results have been changed to the first region in the changing step, binary data that can be expressed using the chromatic ink and the achromatic ink based on the RGB data.

7. An image processing apparatus that, in order to print to a printing region on a printing medium by scanning a first row of nozzles for ejecting chromatic ink and a second row of nozzles for ejecting achromatic ink in a scanning direction, processes data corresponding to an image to be printed to the printing area, the apparatus comprising:
   a determination unit configured to determine, based on data corresponding to the printing region, for each unit region obtained by dividing the printing region in a direction intersecting the scanning direction, whether the unit region is a first region where printing is to be performed using at least chromatic ink, a second region where printing is to be performed using only achromatic ink, or a third region where printing is not to be performed using chromatic ink or achromatic ink; and
   a changing unit configured to, when there exists both a unit region that has been determined to be the first region and a unit region that has been determined to be the second region between unit regions that have been determined to be the third region, change the determination results of the unit region that has been determined to be the second region to the first region.

8. The image processing apparatus according to claim 7, wherein the data corresponding to the printing region is RGB data.

9. The image processing apparatus according to claim 8, further comprising:
   a generating unit configured to generate, for a unit region whose determination results have been changed to the first region in the changing unit, binary data that can be expressed using the chromatic ink and the achromatic ink based on the RGB data.

10. The image processing apparatus according to claim 9, further comprising:
    a printing unit configured to use the first row of nozzles and the second row of nozzles to print to the printing region, based on data that has been generated by the generating unit and can be expressed using the chromatic ink and the achromatic ink and corresponds to the printing region.

11. The image processing apparatus according to claim 10, wherein the length of the second row of nozzles is longer than the length of the first row of nozzles, and the printing unit uses the second row of nozzles to perform printing to a unit region that has been determined to be the second region.

* * * * *